July 16, 1957   S. R. RICH   2,799,737
AUTOMATIC VOLUME CONTROL FOR AMPLIFIERS
Filed Aug. 30, 1944
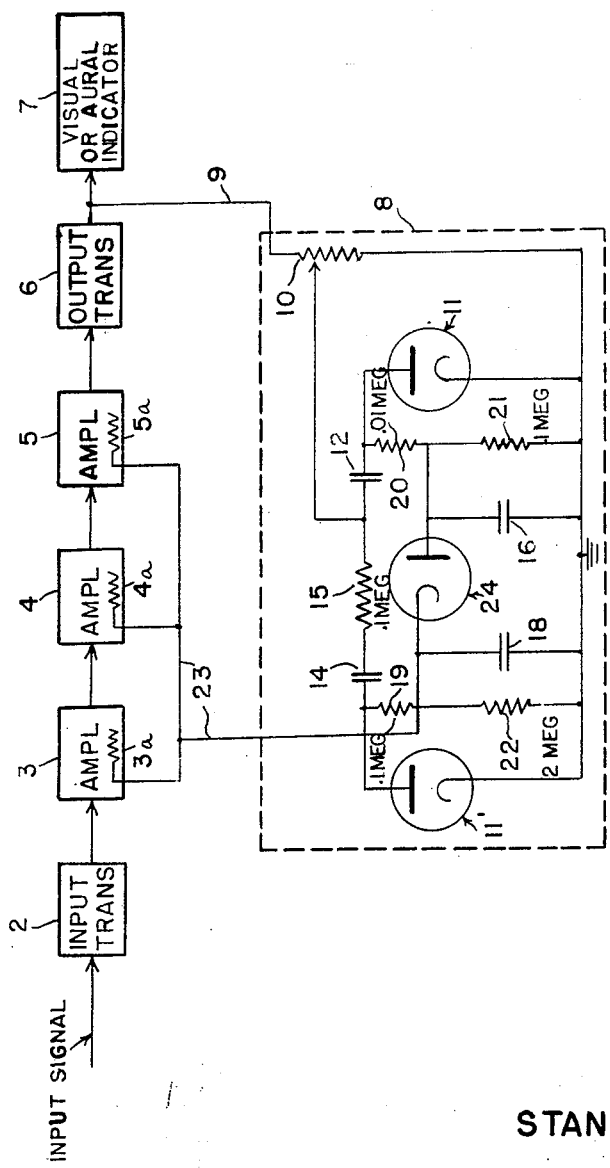
STANLEY R RICH United States Patent Office 2,799,737
Patented July 16, 1957

2,799,737

AUTOMATIC VOLUME CONTROL FOR AMPLIFIERS

Stanley R. Rich, West Hartford, Conn., assignor to the United States of America as represented by the Secretary of the Navy Application August 30, 1944, Serial No. 551,859

12 Claims. (Cl. 179—171)

This invention relates to automatic volume control for electronic amplifiers in which the gain of the amplifier is controlled in accordance with the level of the signal at the output of the amplifier.

The invention is of special utility in underwater sound echo ranging for suppressing reverberation and is described in this connection in the following specification. However, it should be expressly understood that the invention is equally applicable in conjunction with other kinds of apparatus which include electronic amplifiers and which require suppression of unwanted signal components having characteristics similar to those of reverberation signals present in underwater echo ranging equipment. Thus another application of the invention might be to electric seismographs.

In one form of underwater echo ranging apparatus to which the invention may be applied, the direction and range of a target are determined as follows: a pulse of energy having a directional characteristic is emitted from a projector which is movable to any position around the underwater horizon. If a target lies in the path of any such emitted pulse, an echo thereof will be returned to the projector. The bearing of the target will therefore be the same as the bearing of the projector at which the echo pulse was returned and the range may be computed from the time required by the pulse to travel from the projector to the target and return therefrom.

However, one of the difficulties encountered in operation of underwater echo ranging apparatus of the above described type results from the fact that immediately following the transmission of a sound pulse or "ping," the receiver unit of the apparatus is connected to the projector and the reverberation of the sound is received. If the pulse is long enough and of sufficient strength to carry to and from the target with distinguishable intensity, the reverberation is, at times, very severe. Since an echo may be relatively quite weak, the receiver must have enough gain to amplify it to readily recognizable levels. The high gain required tremendously amplifies the reverberation, producing a blast of sound from the loud speaker which is not only very discomforting to the operator but may at times so lower his aural acuity that he will miss a true target echo. If a visual receiver such as a cathode ray oscilloscope is utilized in lieu of, or in conjunction with a loud speaker, the high level of the reverberation produces a high degree of deflection of the cathode ray beam as it sweeps across the oscilloscope screen with the result that it is often very difficult to visually detect the jog of the beam which occurs when a true echo signal is received.

The general object of this invention is to reduce such reverberation to an inconsequential amount through the use of a novel circuit arrangement wherein the gain of one or more amplifier stages in the receiver portion of the echo ranging apparatus is reduced initially to an extent which depends both upon the output level of the reverberation and the period over which it occurs.

A specific object of the invention is to provide a novel automatic volume control circuit for amplifiers in which the time required to restore the amplifier to full gain is less for reverberation or like disturbing signals of comparatively low intensity than for those instances in which the reverberation or like disturbing signals is at a relatively high intensity, and, at the same time to also provide for a longer delay of application of the gain reducing voltage in instances where the reverberation or other disturbing signal is at a comparatively low level.

Another object of the invention is to provide an automatic volume control circuit for amplifiers, which circuit charges to its biasing voltage slowly but discharges rapidly to restore full gain at the onset of a period of reduced reverberation or other noise level.

Yet another object of the invention is to provide an automatic volume control circuit which comprises a capacitor which is charged to a biasing or blocking potential in accordance with the output of the amplifiers, a discharge path for the biasing potential on the capacitor, and means for controlling the impedance of the discharge path in accordance with the characteristic of the output of the amplifier whereby a high output from the amplifier blocks the discharge path but a lower output opens it causing a rapid discharge of the biasing potential thereby effecting a rapid restoration of gain in the amplifier.

A more specific object is to provide an automatic volume control circuit which comprises a first capacitor that is charged to its biasing or blocking potential through a high impedance, a second capacitor charged to a potential through a comparatively lower impedance, a high impedance discharge path for the first capacitor, a comparatively lower impedance discharge path for the second capacitor and an electronic valve between the capacitors whereby the biasing potential on the first capacitor may be discharged quickly through the valve and through the discharge impedance associated with the second capacitor whenever the potential on the second capacitor becomes less negative than the potential on the first capacitor.

These and other objects will become more apparent from the following detailed description and the accompanying drawing, the single figure of which represents a schematic circuit diagram of a preferred embodiment of the invention.

Referring now to the drawing, the electronic receiver unit of the underwater echo ranging apparatus may include an input transformer 2 followed by three stages 3, 4 and 5 of amplification, an output transformer 6 and a visual or aural indicator 7. These components are conventional in construction and have therefore been illustrated in block form only.

The novel automatic volume control circuit to which this invention is directed is enclosed by the broken line block 8. As shown in the drawing, a portion of the output voltage from transformer 6 is fed over conductor 9 to a potentiometer 10 which constitutes the major adjustment of automatic volume control voltage. From potentiometer 10, the signal from the output transformer 6 is rectified by rectifiers 11 and 11'. The respective anodes of these two rectifiers are connected to potentiometers 10, one being so connected through a single capacitor 12 and the other through a capacitor 14 and resistor 15 so that rectifier 11 receives the major portion of the current from potentiometer 10. This is of course due to the fact that the line including capacitor 12 has an impedance lower than the line through capacitor 14, the difference in impedance being represented by resistor 15 which, in this particular embodiment, may have a value of .1 megohm.

The rectified signal from rectifiers 11 and 11' is collected on two capacitors 16 and 18, respectively, of substantially equal size. It should be noted that capacitor 18 is connected into the anode circuit of rectifier 11' through a resistor 19 of .1 megohm while capacitor 16 is connected into the anode circuit of its associated rectifier 11 by a smaller resistor 20 of only .01 megohm. By this arrangement, it is evident that capacitor 18 will charge more slowly than capacitor 16.

Each of capacitors 16 and 18 is provided with a discharge path to ground through a resistor connected in parallel therewith. The discharge resistor associated with capacitor 16 is relatively small as compared to the discharge resistor associated with resistor 18. The resistor associated with capacitor 16 is designated by numeral 21, and in the present embodiment, has a value of .1 megohm while the resistor designated by numeral 22, providing the discharge path for capacitor 18 has a value of 2 megohms. Capacitor 18 thus holds a D. C. potential (negative on the ungrounded side) which can be applied through line 23 to control grids 3a, 4a and 5a of amplifier stages 3, 4 and 5, such stages in the present embodiment consisting of 6SA7 amplifier tubes. The result is that the gains respectively of amplifier stages 3, 4 and 5 are reduced by an amount which depends upon the amplitude of this negative potential.

As will now be explained, the amplitude of this negative potential depends upon the output level of the reverberation as it appears at the output transformer 6 and also upon the period over which the reverberation extends.

As previously explained, the negative charge or potential appearing at capacitor 18 is applied over line 23 to the control grids of the amplifier tubes 3, 4 and 5. The duration of the period over which the charge on capacitor 18 is collected is in turn largely controlled by capacitor 16 and the constants of its discharge circuit to the right of a discharge diode 24 which has its cathode connected to capacitor 18 and its anode to capacitor 16. It will be seen that capacitor 16 has a comparatively low resistance path to ground through its discharge resistor 21 of .1 megohm so that while the charge on this condenser may be initially higher in view of its association with rectifier 11, it can, nevertheless, discharge more quickly than can capacitor 18 through its associated discharge resistor 22 of 2 megohms. Thus as soon as the negative voltage on the anode of diode 24 lowers so that it becomes less negative than the cathode of this tube, which, as previously explained, is connected to capacitor 18, the charge on capacitor 18 will start to leak off through diode 24 and through resistor 21 to ground, taking this path rather than the path through resistor 22 having a much higher impedance, the diode 24 offering a relatively low impedance to this discharge of capacitor 18.

It will be appreciated from the above statement that the amplitude of the biasing or automatic volume control voltage is determined initially by the charge on capacitor 18 but its duration and final value is determined by capacitor 16 which controls the potential of the anode of diode 24. Since capacitor 18 charges relatively slowly because of its high impedance charging circuit, the AVC potential is applied to amplifier stages 3, 4 and 5 comparatively sluggishly but is removed therefrom quite rapidly through diode 24 and resistor 21 to ground whenever the reverberation of other disturbing signals diminishes or ceases. Stated in other words, the automatic volume control circuit is one in which the electrical values of its component parts are so adjusted that the gain of the receiver is not reduced by an initial burst of reverberation or an echo which is also of short duration but is reduced only by a sustained high level of reverberation. However, as soon as the level of the reverberation is reduced the full gain of the receiver is very quickly restored.

Summarizing, as soon as a pulse of compressional wave energy has been emitted by the projector, the receiver unit, represented in this embodiment by component parts 2–7, inclusive, is connected to the projector to ready the former for reception of a pulse echo from a target such as a submarine. However, the first signals which appear at the input transformer 2 are those due to reverberation of the transmitted pulse which may be defined as reflections of the pulse from the surface of the water, the bottom, small bodies and bubbles in the water, and also reflections attributable to thermal stratification. The characteristics of the reverberation vary widely. It may be initially high in level but of short duration in which case its suppression is not so essential since it will most probably disappear long before the true target pulse echo comes through. On the other hand, it may be sustained at a high level for an appreciable period in which case it is most necessary that its effect in the receiver indicating means be attenuated so that the indication due to the true target pulse echo may be distinguished clearly.

If the reverberation is initially at a high level, but of short duration, the AVC potential, which varies as the charge on capacitor 18, will not be high because of the slow charging characteristic of this capacitor. Consequently the gain of the amplifier stages 3, 4 and 5 will be reduced but little. However, if the reverberation is at a high amplitude level and is sustained at such level for a considerable period, the AVC potential will rise to a considerable negative value with the result that the gains of the amplifier stages are considerably reduced which thereby effectively suppresses the reverberation effect in the indicator 7. Capacitor 16 of course is also charged by the reverberation. However, should the reverberation now terminate abruptly, capacitor 16 will discharge very quickly thereby lowering the negative potential on the anode of diode 24 which permits the charge on capacitor 18 (and hence the AVC potential) to dissipate itself quickly through diode 24 and resistor 21. Thus the gain of the receiver unit is restored quickly.

In conclusion, it will now be evident that with my improved and novel automatic volume control circuit, the gain of the receiver unit is depressed by an amount which varies with the character of the reverberation to the desirable end that when reverberation is light the receiver gain is reduced but little. However, when reverberation is heavy, the receiver gain is reduced to a value which satisfactorily suppresses its effect in the indicator unit. Furthermore, as soon as the reverberation ceases, the AVC potential is removed quickly thereby effecting rapid recovery of the receiver unit to full gain characteristic. Thus through my novel AVC circuit, the gain of the receiver is reduced to suppress reverberation but only for the minimum time required to accomplish this function.

In closing, it will be evident that various changes and modifications may be made in the above-described novel circuit arrangement which constitutes this invention without departing from the spirit and scope thereof as defined in the appended claims. For example, the AVC potential in the circuit described is shown as being applied to all three stages of amplification in the receiver circuit. However, under some conditions, it may be desirable to apply such potential to only one of the amplifier stages.

Having thus fully described my invention, I claim:

1. An automatic volume control circuit for an amplifier comprising means to rectify a portion of the amplifier output potential, means to apply such potential so rectified to a capacitor and to a grid of at least one of the tubes of the amplifier to reduce the gain thereof, means to rectify another portion of the amplifier output potential and to apply such potential so rectified to a second capacitor, a bridging resistor for said second capacitor of a relatively low value whereby a quick discharge path is provided for said capacitor, and an electronic valve between said two capacitors whereby the potential applied to the amplifiers to reduce the gain can be discharged quickly to ground whenever the potential of the second capacitor becomes less negative than the potential of the first capacitor.

2. In a rectifier circuit for alternating current, a condenser connected for charging through an alternating current rectifier, a relatively high resistance discharge path connected to said condenser, a separate and distinct relatively low resistance discharge path connected to said condenser through a second rectifier, and means responsive to a decrease in the current strength and coupled to the second rectifier for rendering said second rectifier conductive.

3. In a rectifier circuit for alternating current, direct current potential storage means, means connected to said storage means for relatively slowly charging said storage means to a potential related to the average intensity of the alternating current potential, a separate and relatively rapid discharge means connected to said storage means and comprising a rectifier in a fast time constant discharge circuit and means coupled to said rectifier for rendering said rectifier conductive upon a decrease in the current strength.

4. In a rectifier circuit for converting alternating current into direct current, a condenser, first rectifier means for charging said condenser to a first potential related to the potential of the alternating current, a relatively high resistance discharge path for said condenser permitting said first potential to follow only slow variations of the amplitude of said alternating current, a second condenser, second rectifier means for charging said second condenser to a second potential related to the potential of said alternating current and greater than said first potential, a relatively low resistance discharge path for said second condenser whereby said second potential follows rapid variations in the amplitude of said alternating current and may become less than said first potential, and additional rectifier means for discharging said first condenser through said low resistance discharge path when said second potential becomes less than said first potential.

5. In an automatic gain control for an electronic receiver comprising a rectifier for charging a first condenser in a relatively long discharge time constant circuit with a gain control potential related to the average signal intensity, means for providing a second potential related to the average signal intensity on a second condenser in a relatively fast discharge time constant circuit, and rectifier means connected between said condensers for preventing the potential of the charge on said first condenser from exceeding the potential of the charge on said second condenser.

6. In an automatic gain control for an electronic receiver, a short time constant circuit including a rectifier for producing on a condenser a potential related to the average intensity of signal current in the receiver, a second rectifier connected to a long time constant circuit for producing on a second condenser a second potential related to the average intensity of said signal current, and rectifying means interconnecting said circuits for rapidly discharging said second condenser in response to a differential potential of predetermined polarity between said condensers.

7. In an automatic gain control for an electronic receiver, a short time constant circuit including a rectifier for producing on a condenser a potential related to the average intensity of signal current in the receiver, a second rectifier connected in a long time constant circuit for producing on a second condenser a second potential related to the average intensity of said signal current, said second potential being supplied as an automatic gain control voltage, and rectifying means connected between said circuits and responsive to a decrease in said average intensity for rapidly discharging said second condenser in response to rapid discharge of said first condenser.

8. The combination in an automatic gain control system for an electronic receiver of a condenser, means for charging said condenser to a potential related to the average intensity of the received signal, a relatively long time constant discharge path for said condenser, a relatively short time constant discharge path connected to said condenser through a rectifier, the last-mentioned path being separate from said charging means and the first-mentioned path, and means responsive to a decline in the signal strength and coupled to said rectifier for rendering said rectifier conductive.

9. In an electronic receiver, the combination comprising automatic gain control means including a condenser and means for relatively slowly charging said condenser to a potential related to the average intensity of the received signal, discharge means for said condenser comprising a relatively short time constant circuit separate from said charging means and connected to said condenser through an electron tube, and means responsive to a decreasing received signal intensity for rendering said tube conductive.

10. An automatic volume control comprising an amplifier, rectifying means connected to said amplifier and having a pair of rectifying paths a first branch circuit means to apply a signal from a first of the rectifying paths temporarily to reduce the amplifier receiver gain, and second branch circuit means to utilize a second of said rectifying path portions to control the restoration of amplifier gain from the level to which such gain had previously reduced, said second branch circuit comprising an electronic tube having a cathode connected to said first branch circuit means.

11. A device in accordance with claim 10 in which the paths have respective relatively high and low component values to give a slow reduction and a rapid restoration.

12. A device in accordance with claim 11 in which said first circuit branch means comprising a capacitor, and discharge path means for said capacitor comprising said electronic tube, whereby a one way discharge path is provided for said capacitor.

References Cited in the file of this patent

UNITED STATES PATENTS

| | | |
|---|---|---|
| 2,286,106 | Ritzmann | June 9, 1942 |
| 2,304,331 | Belar | Dec. 8, 1942 |
| 2,515,196 | Coe | July 18, 1950 |